Sept. 5, 1961     T. G. PILETTE, JR     2,998,894
REUSABLE SHIPPING CONTAINER
Filed Jan. 16, 1959     4 Sheets-Sheet 1
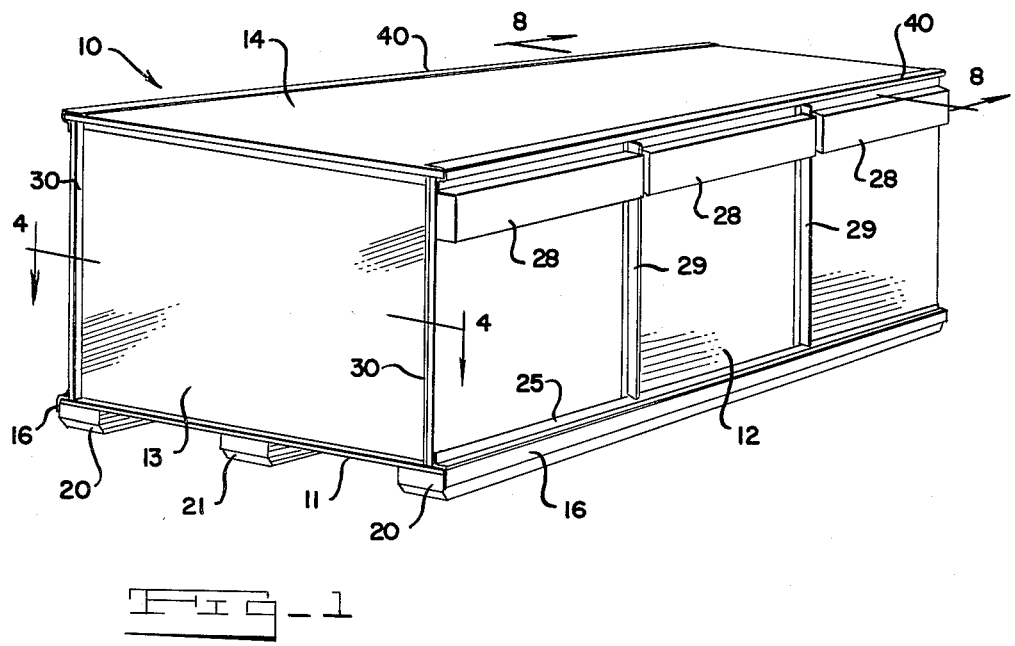
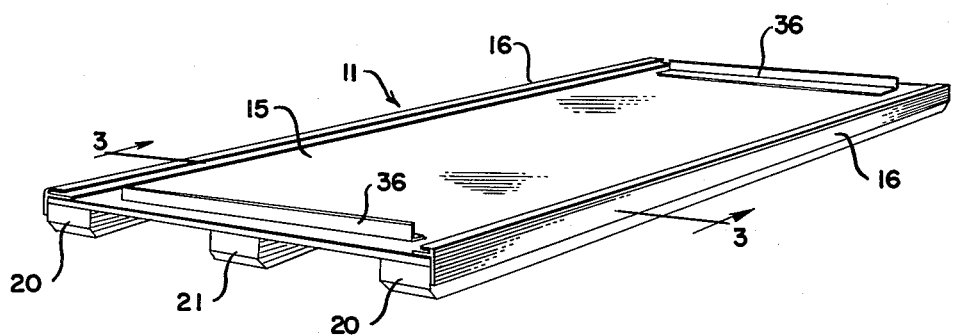
INVENTOR.
THOMAS G. PILETTE, JR.
BY
ATTORNEYS

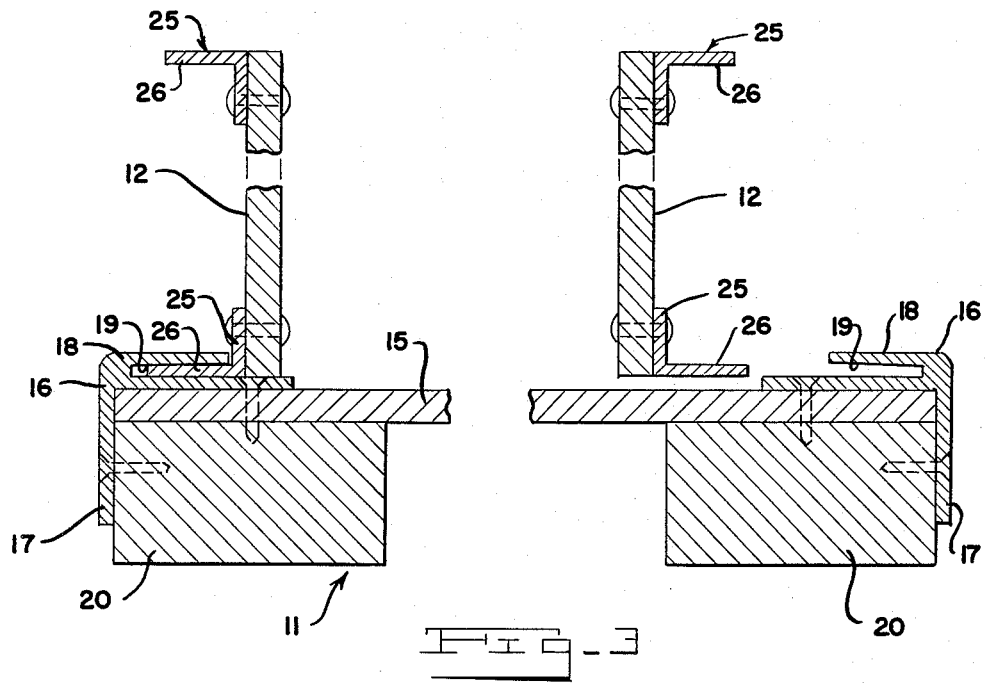
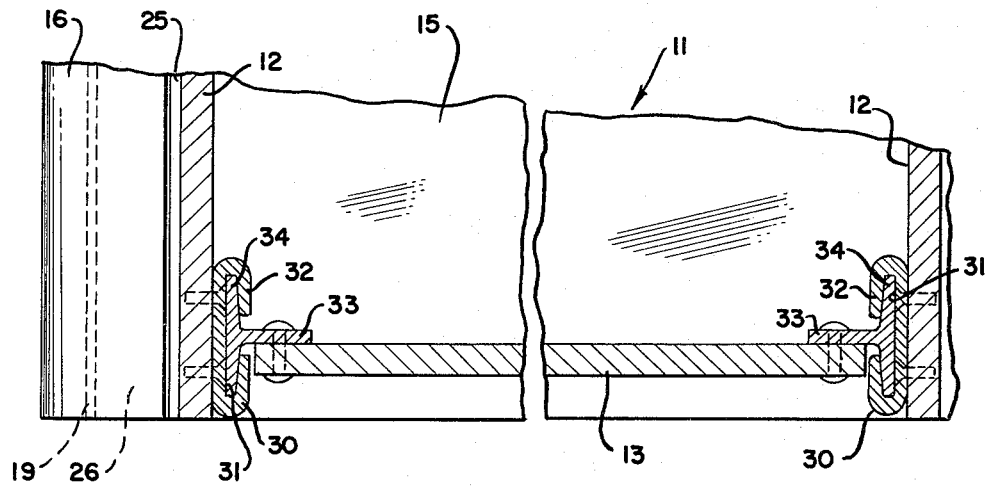

Sept. 5, 1961 T. G. PILETTE, JR 2,998,894
REUSABLE SHIPPING CONTAINER
Filed Jan. 16, 1959 4 Sheets-Sheet 3

INVENTOR.
THOMAS G. PILETTE, JR.
BY Cullen & Cantor
ATTORNEYS

INVENTOR.
THOMAS G. PILETTE, JR.
BY Cullen & Canton
ATTORNEYS

United States Patent Office

2,998,894
REUSABLE SHIPPING CONTAINER
Thomas G. Pilette, Jr., 10139 Harper, Detroit 13, Mich.
Filed Jan. 16, 1959, Ser. No. 787,184
3 Claims. (Cl. 217—12)

This invention relates to a reusable shipping container and more particularly to a large size, heavy duty shipping container which may be easily assembled and disassembled for shipping either loaded with merchandise or in a knock-down condition.

In the shipping of large parts, such as machines and machine components, automobiles, parts of automobiles, etc., it is common to use large size shipping crates normally made of wood and nailed together to surround and protect the merchandise being shipped. Ordinarily, when the merchandise reaches its destination, the shipping container is pulled apart and destroyed in so doing, and thus is thrown away.

It is to be noted, that even if the large size containers were disassembled in such a way that they were not completely destroyed or broken apart, the cost of shipping an empty container is frequently as much as the cost of shipping one that is loaded with merchandise. For example, the cost of shipping by ocean transportation is based upon a cubic foot charge regardless of the weight and thus, shipping an empty container costs just as much as a full container.

Where companies manufacture and ship quantities of large items, the cost of the shipping containers used during a year amounts to a substantial sum of money.

Thus, it is an object of this invention to form a large size shipping container which has the rigidity and durability to protect and hold the merchandise being shipped but which can be re-used over and over again.

Another object of this invention is to form such a shipping container out of standard basic component parts which may be quickly assembled in a few moments, as compared to the several hours that it now takes to form currently used shipping containers, and which can be shipped and then disassembled in a few minutes and returned to the shipper in a knock-down flat condition. In a knockdown condition, the cost of shipping the container is at an absolute minimum and the container may then be economically re-used.

Still another object of this invention is to form a shipping container which may be assembled out of a number of component parts, which parts are interconnected by frictional connecting means, without the use of any mechanical fastening means such as screws or nuts or bolts so that the parts may be quickly banged together by one man and quickly disassembled by one man without the necessity of using any tools, with the possible exception of a hammer. Further, the connections are so formed that the load of the merchandise within the container, which normally tends to press outwardly against the walls of the container and push the container apart, functions to lock the connection joints together even more tightly, so that the load caused by the merchandise is utilized to maintain the container in its rigid, assembled condition.

These and other objects and advantages of this invention will become apparent upon reading the following description of which the attached drawings form a part.

With reference to the attached drawings, in which:

FIG. 1 is a perspective view of the complete container in a shipping condition.

FIG. 2 is a perspective view of the pallet or base of the container.

FIG. 3 is a cross-sectional view, of a fragmentary section of the pallet and side walls taken as if in the direction of arrows 3—3 of FIG. 2, to show the assembling of the side walls.

FIG. 4 is a cross-sectional view of the end and side walls taken in the view of arrows 4—4 of FIG. 1.

Figure 5:
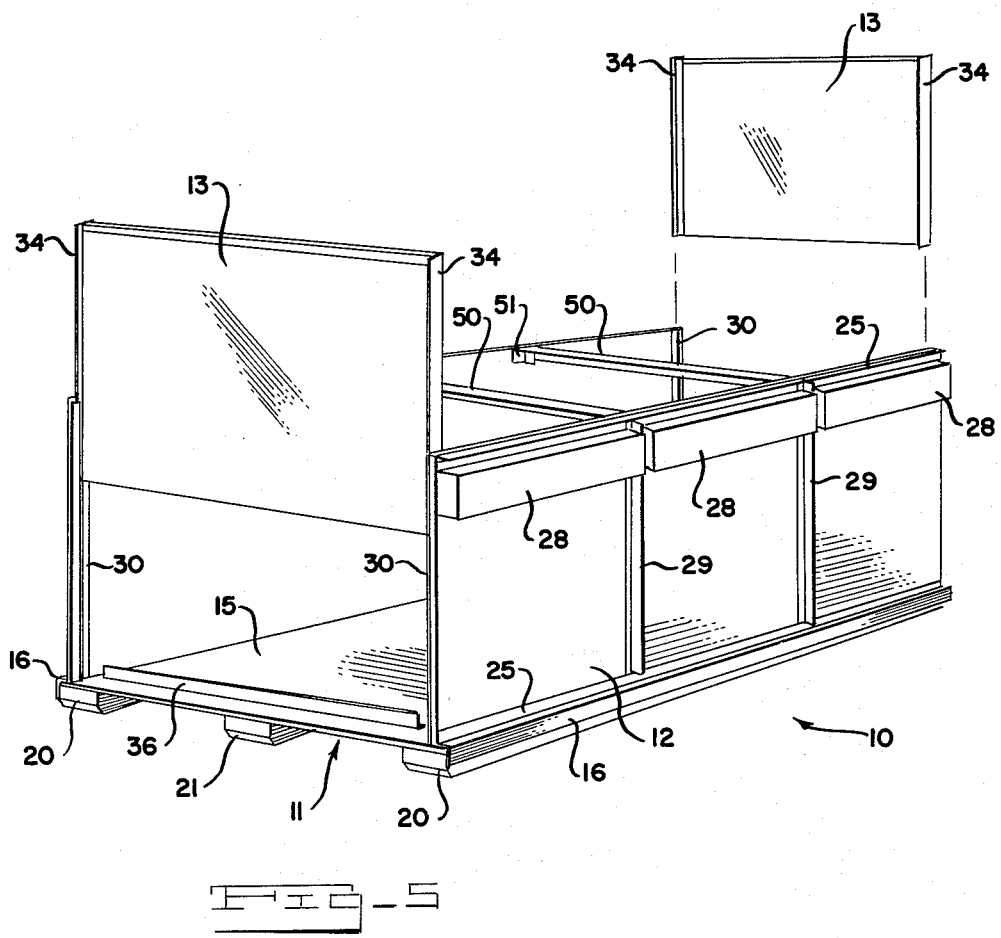
FIG. 5 shows the container assembled without its top, with one end wall slid partially upwardly and the other end wall completely disengaged from the side walls to show the assembly of the end walls.

With reference first to FIGS. 1 and 5, the container herein, generally designated as 10, is formed of a pallet or base 11, side walls 12, end walls 13, and a top cover 14.

The pallet or base 11 (see FIGS. 2 and 3) is formed of a flat sheet 15 having an angle 16 secured to the opposite side edges thereof. The angle 16 (see FIG. 3) is formed with a vertical leg 17 extending downward below the side edge of the sheet 15 and a horizontal leg 18 arranged on the top of the sheet 15. The leg 18 is bifurcated to form a channel 19. The channels on the two opposite angles face towards each other, that is, they are inwardly directed, and preferably they are tapered so that the mouths thereof are wider than the bases.

The angles 16 may be secured to the base by any suitable securing means, such as screws or nails, etc., and are permanently affixed thereto.

On the bottom surface of the base, skids 20 are rigidly and permanently secured and are reinforced and protected by the angle legs 17. Center skids 21 may also be used, depending upon the width of the base. The purpose of the skids is to enable sliding the container and also to raise the bottom of the base off the supporting decks or floor so that a lift truck can get beneath it.

The side walls are provided with continuous right angles 25 at their upper and lower edges (see FIG. 3) with the angles being permanently secured to the side walls so that each presents an outwardly directed flange 26. As shown in FIG. 3, the lower flanges 26 are formed to be jammed into the channels 19. Thus, the lower flanges 26 snugly fit within a channel 19 and any outward load upon the side walls jam the flanges even more tightly into the channels. When it is desired to remove the side walls from the base to disassemble the container, a blow on the angle 25 from the outside of the container will force the respective flanges out of their channels.

As seen in FIG. 1, the side walls may also be provided with blocks of wood 28 for the purpose of enabling stevedores and loaders to sink their hooks into the blocks of wood and thereby grab and move the container. Also, reinforcing bars 29 of any suitable reinforcing metallic material may be used to brace and rigidify the side walls.

The end walls are secured to the side walls of the container by means of slide strips 30 secured to the vertical edges of the side walls (see FIG. 4). The strips are channeled at 31 and undercut to form lips 32 which are spaced inwardly from the respective side walls. The end walls 13 are each provided with permanently secured T-members 33 whose flanges 34 fit within the channels 31 and beneath the undercut members 32.

The channel strips 30 are open at their upper ends so that the end walls 13 are assembled by sliding their T-members 33 downwardly into the channels 31 until the end walls 13 are properly positioned. A stop 36 is preferably provided at each of the opposite ends of the base and are secured to the base to abut against the lower center edge, inside of the container, of the end walls to prevent them from being pushed inwardly.

Figure 8:
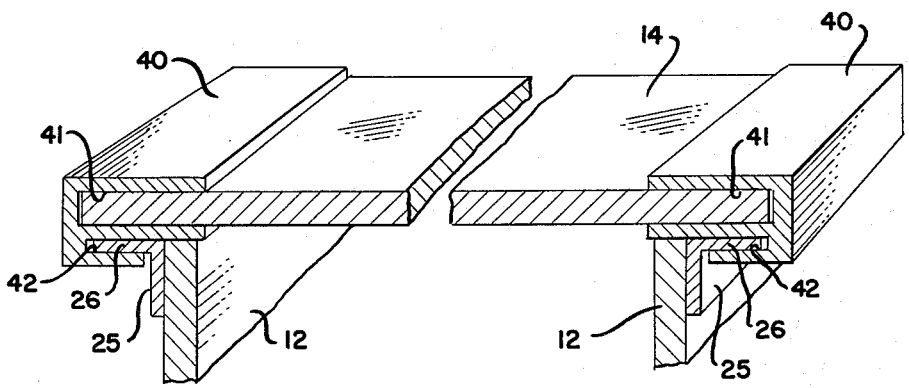
FIG. 8 is a fragmentary cross-sectional view taken in the direction of arrows 8—8 of FIG. 1.

The top cover of the container is formed with edgings 40 on its opposite side edges (see FIG. 8) which edgings are formed with two channels 41 and 42. The upper channel 41 receives the edge of the cover 13 and is permanently secured thereto and the lower channel 42 receives the flange 26 of the top horizontal edge of the side walls. To assemble the cover to the box, the cover is simply slid along the box in a horizontal direction so that the flanges 26 are slidably received into the channels 42. The channels 42 are preferably formed with a slight taper so that outward pressure upon the walls 12 will force the flanges 26 more tightly and more deeply into the channels 42.

To remove the cover, the cover is simply slid off the box horizontally in the direction of the length of the flanges 26.

Figure 6:
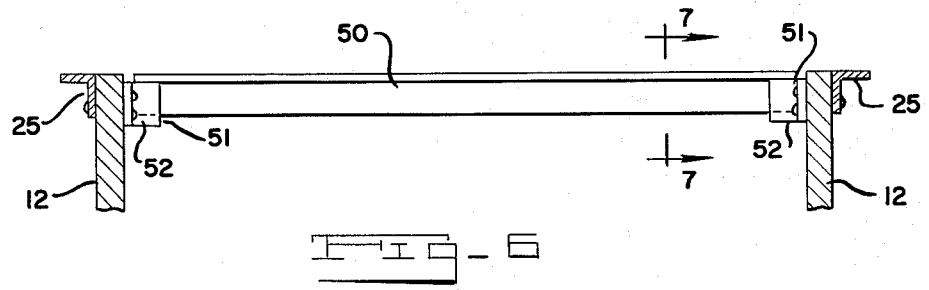
FIG. 6 is a view showing the reinforcing bars.
Figure 7:
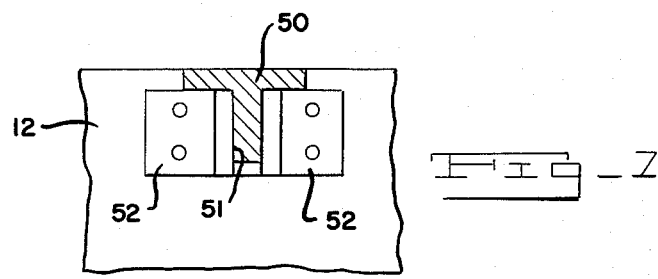
FIG. 7 is an enlarged cross-sectional view taken in the direction of arrows 7—7 of FIG. 6.

In shipping, containers are frequently piled one above the other in the hold of a ship or railroad car. Therefore it is desirable to have reinforcing bars along the top center part of the container to reinforce the cover and receive the load of containers stacked on top. Such reinforcing bars (see FIGS. 5, 6 and 7) may be in the form of T-shaped bars 50 which extend across the width of the open top of the container and are received in sockets 51 which may be in the form of two angle brackets 52 spaced apart sufficiently to receive the vertical web of the bar 50, whereby the top web rests upon the brackets. It can be seen, that with this construction downward loads on the container are transmitted from the cover to the reinforcing bars 50, then down through the side walls 12 to the base. This prevents the top cover from collapsing or being broken.

Operation

In operation, the pallet or base 11 may be loaded with large items of merchandise before assembling the container. Thus, by loading the large items, they can be carefully placed and carefully positioned and carefully secured, where necessary, to the base. Thereafter the container can be assembled around it. Alternatively, at some times it may be desirable to assemble the container first and then load the merchandise into it. The container walls require only a few inches of pallet space for assembly so that the pallet may be almost completely covered by the items to be shipped. Thereafter the container may be filled with the usual stuffing and protecting material, such as excelsior.

In assembling the container, first the side walls 12 are assembled by a man raising them into a vertical position and then kicking the lower edge so that the flanges 26 fit into the channels 19. Then the end walls 13 are assembled by placing the bottom ends of the flanges 34, of the opposite T-members 33, into the side wall channels 31 and letting the end walls drop vertically into position. Thereafter, the reinforcing bars 50 may be dropped into their respective sockets, and finally, the cover will be picked up, arranged into a horizontal plane, so that the flanges 26 fit into the channels 42, and then the cover is slid in a horizontal direction along the length of the channels until the cover completely covers the container.

No other mechanical fastening means are required or needed although, to prevent pilferage, it may be desirable to use a suitable lock to secure the cover in position.

Once the container is shipped and arrives at the destination, it is disassembled simply by pulling the cover off, that is, sliding the cover off the side walls, and lifting the end walls vertically upwards after removing the support bars 50. Thereafter, a few blows at the bottom edges of the side walls will pull the side wall flanges 26 out of the channels 19 and leave the pallet free. The merchandise may then be removed from the pallet without the interference of the walls of the container. Once the pallet is unloaded, all the parts may be placed on top of one another, in a flat position, and transported back to the sender.

It can be seen, that there is no need for mechanical fastening means in connecting the container together or in disassembling the container. All of the connecting means are of frictional type which quickly locks and disengages upon application of manual force. Each of the parts of the frictional locking connections are permanently secured to their respective container members by nails or screws or the like so that they are not lost and also so that they protect the various edges of the component parts of the container.

This invention may be further developed within the scope of the following attached claims. Accordingly, it is desired that the foregoing description be read as being merely illustrative of an operative embodiment of this invention and not in a strictly limiting sense.

I now claim:

1. In a shipping container, the combination comprising a wood base, vertically arranged wood side walls and end walls, and a cover; the base being a horizontally arranged flat wood sheet having at its edges wood skid rails under it, and having F-shaped metal edge members embracing its side edges and such rails; the side walls being flat wood sheets having top and bottom angles secured at the top and bottom edges of the side walls, with such angles defining outwardly extending flanges at such top and bottom edges; the cover being a flat sheet having E-shaped metal edge members embracing its side edges; the edges of the base being under and in contact with the lower cross bars of the F-shaped members and the top and lower cross bars of the F-shaped members forming inwardly opening channels, that is, opening towards each other, and the legs of these members covering the side edges of the base and the skid rails under the base and nailed horizontally to such rails; the edges of the cover being within the inwardly facing channels defined by the upper and center cross bars of the E-shaped members; with fasteners projected down through the upper cross bars of the E-shaped members into the cover; the flanges of the side walls being within the inwardly facing channels defined by the cross bars of the F-shaped members and the lower and center cross bars of the E-shaped members, and means releasably connecting the end walls to the side walls.

2. A construction as defined in claim 1 and wherein the inwardly facing channels of the F-shaped members that receive the lower flanges of the side walls are tapered, decreasing from their mouths into which the flanges enter.

3. A shipping container comprising a base formed of a horizontally arranged, flat sheet having side edges and skid rails secured to its bottom face along its side edges, and having F-shaped metal edge members embracing its side edges and the rails; a pair of flat sheet side walls, a pair of end walls, and a cover; the side walls being normally vertically arranged and having top and bottom angles secured at its top and bottom edges, the angles defining outwardly extending flanges at said top and bottom edges; channels formed on the vertical edges of the side walls for slidably receiving tongues formed on the vertical edges of the normally vertically arranged end walls for interlocking the adjacent vertical edges of the side and end walls against relative horizontal movement; the cover being a flat sheet having E-shaped metal edge members embracing its side edges; the lower cross bars of the F-shaped members being in contact with the top surface of the base, and being wider than the upper cross bar, the legs of the F-shaped members covering the side edges of the base and the skid rails and being secured to the rails; the two cross bars of each F-shaped member forming inwardly opening tapered channels, that is, opening towards each other, with the taper decreasing from their mouths towards their bases; the edges of the cover being permanently secured within the inwardly facing channels defined by the upper and center cross bars of the E-shaped members; the bottom cross bars of the E-shaped members being narrower than the center cross bars; the bottom flanges of the side walls being inserted and frictionally locked within the inwardly facing channels defined by the cross bars of the F-shaped members and rested upon the bottom cross bars of the F-shaped members, and the top flanges of the side walls being inserted within the channels defined by the lower and center cross bars of the E-shaped members and in contact with the bottom surfaces of the center cross bars, with the cover being removable by longitudinally sliding of the cover along the upper flanges of the side walls.

References Cited in the file of this patent

UNITED STATES PATENTS

| | | |
|---|---|---|
| 2,299,175 | Procissi et al. | Oct. 20, 1942 |
| 2,547,672 | Spanjer | Apr. 3, 1951 |
| 2,640,620 | Walklet | June 2, 1953 |
| 2,890,809 | Poley | June 16, 1959 |